Patented May 2, 1944

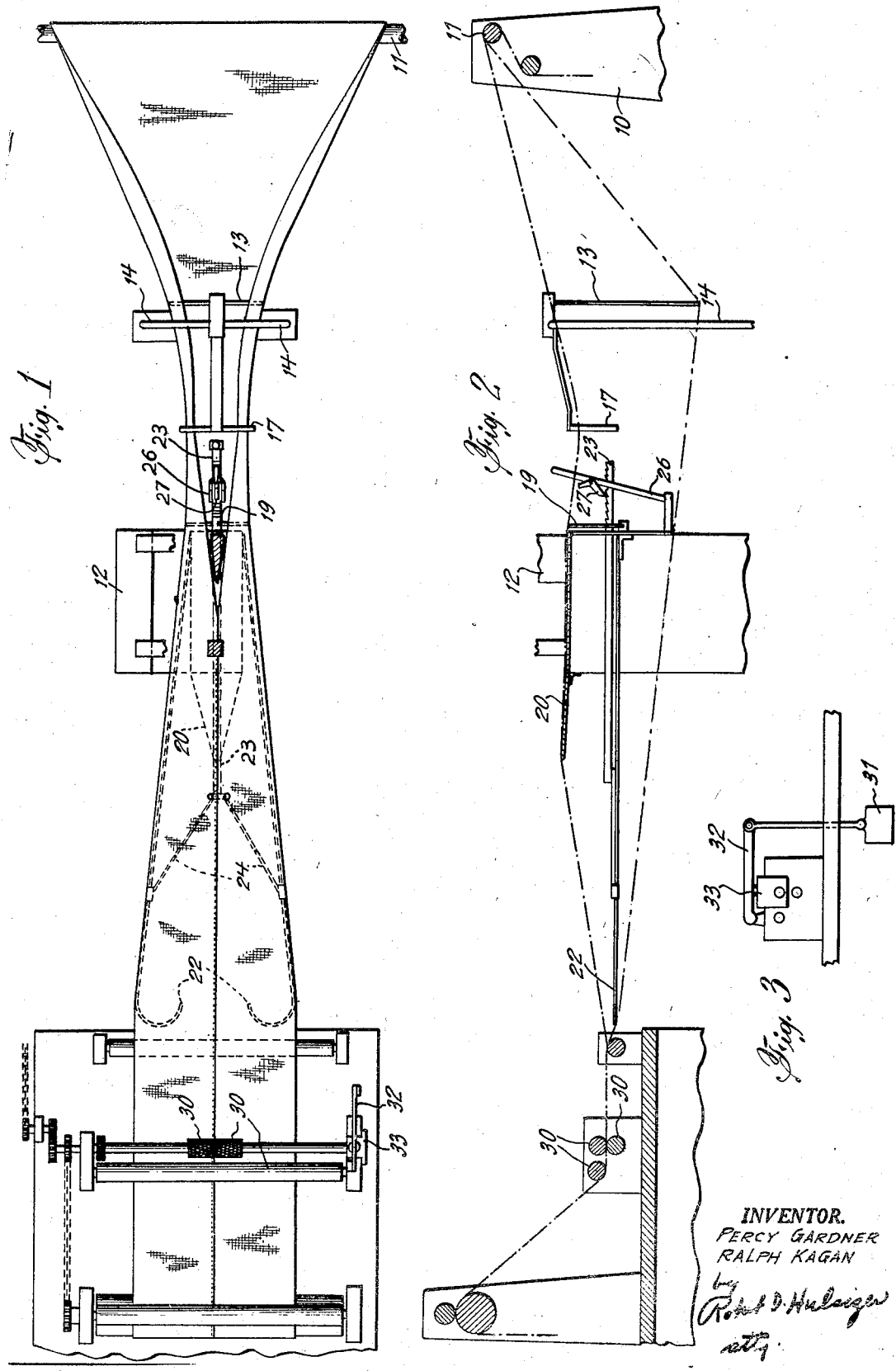

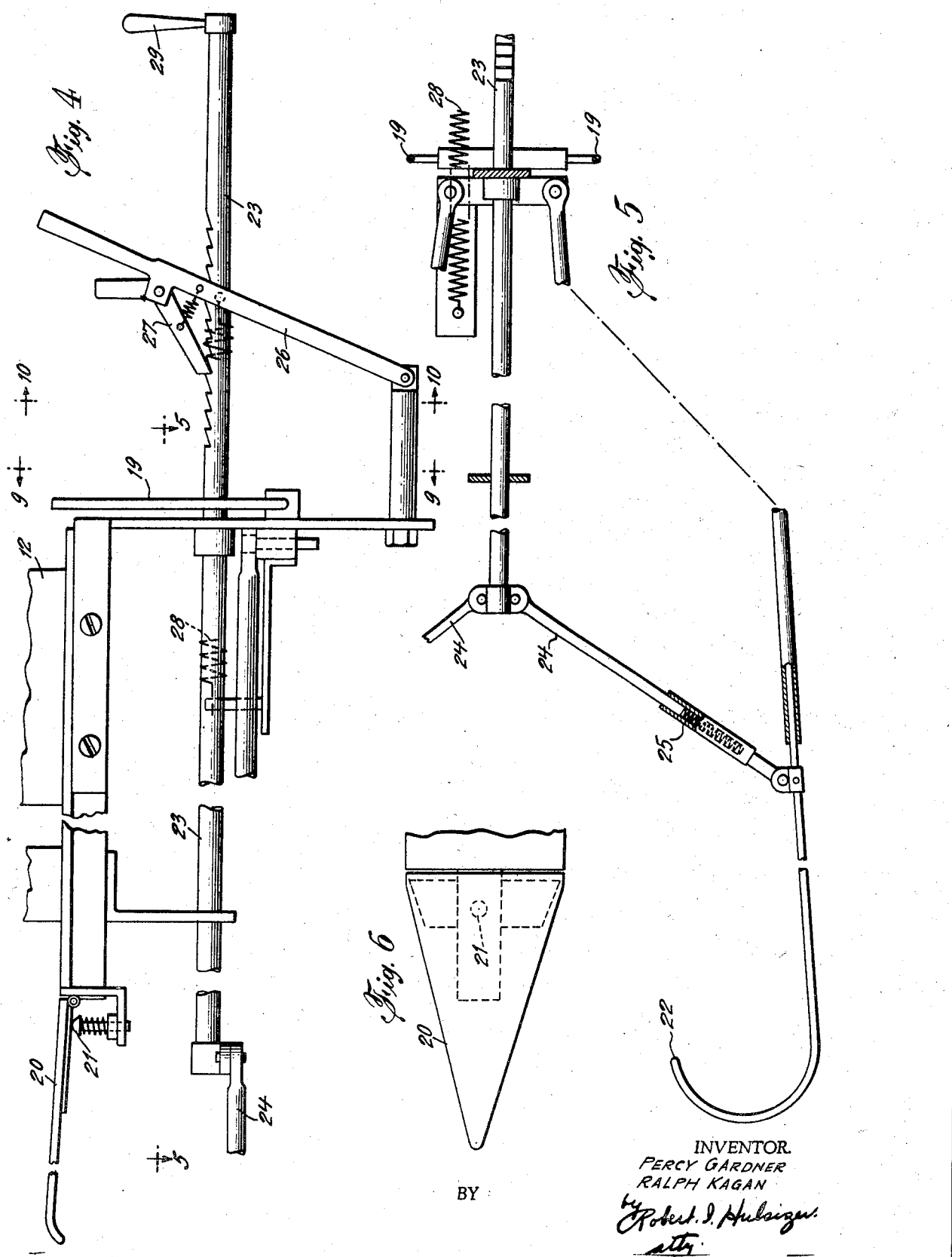

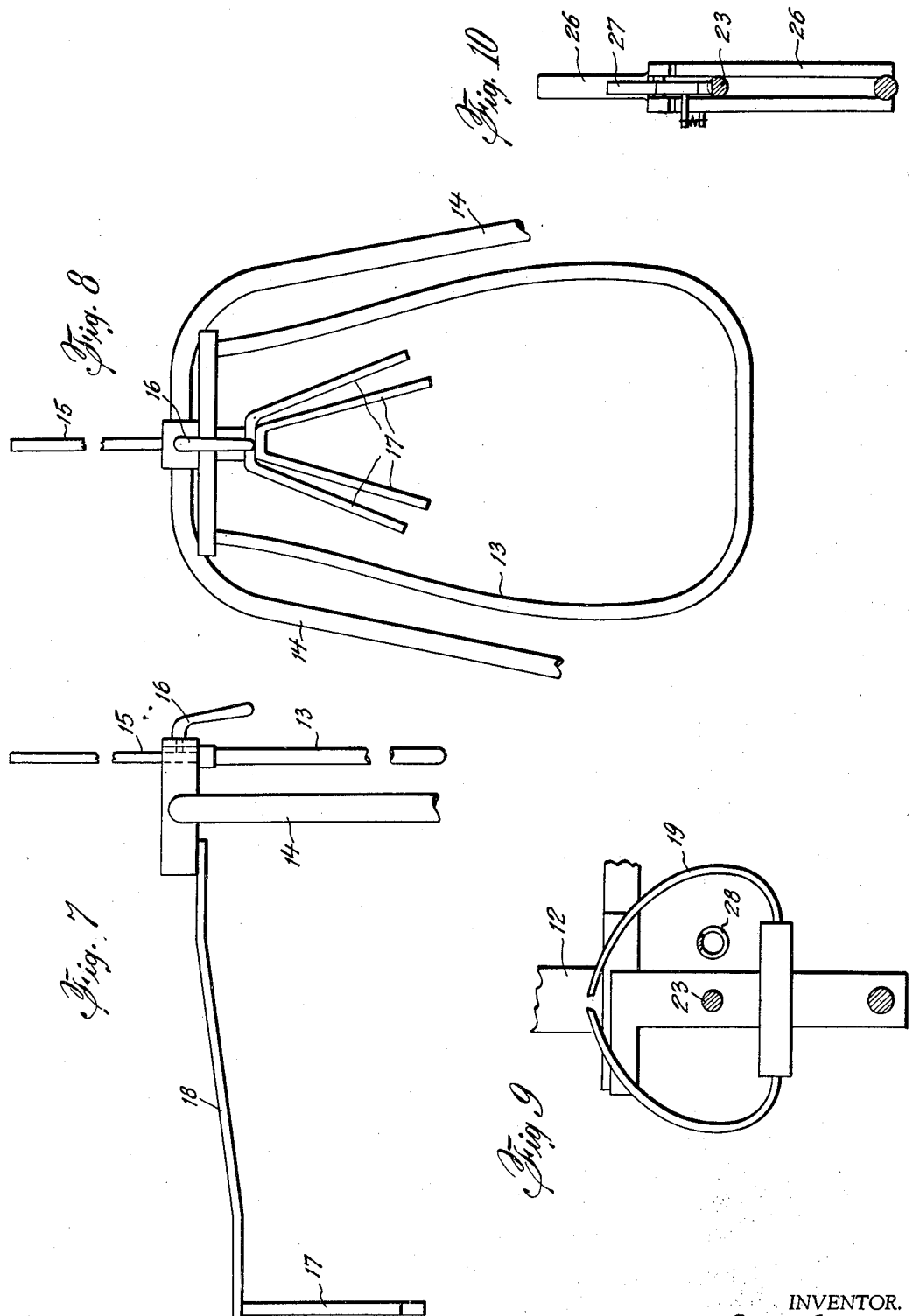

2,347,901

UNITED STATES PATENT OFFICE 2,347,901

APPARATUS FOR FORMING TUBULAR MATERIAL

Percy Gardner, Glen Ridge, N. J., and Ralph Kagan, Brooklyn, N. Y., assignors to Lever Bias Machine Corporation, New York, N. Y., a corporation of New York Application March 19, 1941, Serial No. 384,224

1 Claim. (Cl. 112—63)

This invention relates to new and useful improvements in apparatus for forming tubular fabric which is later to be cut up into bias tape and the like.

An object of the invention is to more positively and accurately guide the material from a flat sheet form into a tubular form as it approaches the machine for joining the edges into a tube.

Another object is to smoothly guide the material from the joining point to a pull-away device and from a tubular shape into a flat form adapting it to be wound up into a roll.

A further object is to so co-relate the operation of the above combinations of devices that one operator can easily turn out larger quantities of material with much less effort and with a resultant product which is more even and regular in its construction.

Further objects, features and advantages will more clearly appear as consideration is given to the following detailed description, especially when taken in connection with the accompanying drawings which form part of the specification.

Briefly and generally considered, the invention includes a joining mechanism which may be a sewing machine or a machine for adhesively joining adjacent edges of material to form a tube. On one side of the joining means is a support from which the material in flat sheet form is pulled to and through the joining means. In this movement the material is engaged by a plurality of forming devices which gradually and progressively change its shape from that of a flat sheet to that of a tube, so that as the material reaches the joining device it is substantially all ready to be joined at its adjacent edges and calls for a minimum of effort on the part of the operator to achieve this result.

One of these devices for forming the material and disposed between the support and the joining means is adjustable vertically and has a somewhat curved U-shape to imitate the formation of the sheet material into a tube and to positively define the diameter of the tube through the line of joining. Another of these forming devices engages the upper edges of the sheet to draw them still closer together in the simulation of a tubular outline.

On the other side of the joining means is disposed a pull-away device which comprises a series of rollers which press on the material and are so designed to pull mainly on the material along the center line which is coincident with the line of the seam along which the edges have joined. This pull-away device is power-driven by means which are adjusted to operate in synchronism with the operation of the joining means and constitutes preferably the only device on the apparatus which advances the material therethrough since generally the joining device is constructed merely to joining the adjacent edges of the formed sheet and not to advance it.

Between the joining means and the pull-away mechanism are disposed two forming devices. One of these is a stretching device disposed close to the pull-away mechanism and within the tube to stretch the tube out flat just before it passes between the pull-away rollers. This stretching device in one form is a pair of arms which can be generally adjusted to vary their pressure on the tube but are provided with means whereby each arm can independently yield as the character or dimension of the tube along its length may vary.

Another device is disposed between the joining means and the pull-away mechanism, and is disposed adjacent the joining means. This device is resiliently supported to exert a pressure on the tube shortly after it leaves the joining means and preferably along the line of the seam to stretch the same and tend to flatten or smooth out the material along the seam line.

It is to be observed that the level of the pull-away rollers first engaging the flattened tube is about in line with the center of the tube as it passes and is engaged by the adjustable forming means. It is clear that this relation of parts and levels will cause as even as possible a pulling effect on the tube both along the joining line and the opposite portion thereof, so that the material will flow smoothly and evenly through the apparatus requiring very little if any effort from the operator to keep it running evenly and straight except that of guiding the edges immediately adjacent the joining means to said means.

The present preferred form which the invention assumes is shown in the drawings, in which—

Fig. 1 is a somewhat schematic plan view of the entire apparatus;

Fig. 2 is a somewhat similar side view;

Fig. 3 is a detail;

Fig. 4 is a side elevation of a portion of the apparatus illustrating the means for adjusting the stretcher arms;

Fig. 5 is a horizontal section on the line 5—5 of Fig. 4;

Fig. 6 is a plan view of a portion of Fig. 4 showing the vertical tensioning plate;

Fig. 7 is a side elevation of the parallel forming means;

Fig. 8 is a somewhat enlarged view of the same;

Fig. 9 is a vertical cross-section taken on the line 9—9 of Fig. 4; and

Fig. 10 is a vertical cross section taken on the line 10—10 of Fig. 4.

As shown in the drawings, the invention comprises a combination of elements or devices which are adapted and related to engage and act on the goods in order to transform it from a flat sheet to a joined tube, and then to flatten it out again after it has been made into a tube in order to roll it up. Any suitable support may be provided for the sheet material, and in the drawings there is shown a support member 10 having rolls 11 over which the material may pass. This material may come from any suitable source but passes over the roll in a flat sheet form. The material is advanced to a joining device, indicated generally by the numeral 12. This joining device may be a sewing machine or a machine adapted to join the edges of the material adhesively or by means of adhesive tape, or any other suitable device for joining the edges together.

In order to most effectively present the material to the joining device and require as little effort as possible of the operator to induce the adjacent edges to the joining device, there are disposed between the joining device and the support 10 a plurality of material forming means which will accurately guide and control the material from a flat sheet form to a tubular form. The first of these devices is indicated by the numeral 13 and comprises a substantially U-shaped curved frame which is dependent from a standard 14 connected to the floor and is vertically adjustable, as shown in Figs. 7 and 8, by means of a sliding rod 15 and adjusting handle 16, so that this curved frame can be moved vertically. As shown in Figs. 1 and 2, the material passes around the bottom and sides of this forming frame and by reason of its vertical adjustment the level of the portion of the tube opposite the joining line is definitely determined.

As shown in Fig. 7, spaced angularly disposed upper edge forming devices 17 are supported from the standard 14 by means of a bar 18 in advance of the forming member 13, and these elements are disposed nearer the joining device to more closely confine and draw the adjacent edges of the tubular material together. Still closer to the joining device is a curved ring-like guide member 19, shown in Fig. 9. This is mounted on any suitable portion of the frame of the joining device and is the last forming unit engaging the material before it passes through the joining point.

As shown in Fig. 1, it will be obvious that these various elements which progressively engage the material will gradually and evenly transform it from a flat sheet form to a substantially tubular form, so that the operator can very easily manipulate the edges to the joining means and keep the material running smoothly and evenly therethrough.

After the material passes through the joining device the joined seam portion is placed under regulated tension by means of the pressure plate shown in Figs. 4 and 6. This pressure plate member 20 is pivoted to the frame of the joining device and pressed upwardly by a spring engaged stud 21, so that it exerts an upward pressure along the seam, and is preferably triangular in shape so that the narrow point of it will more effectively exert this pressure on the seam.

Still further beyond the joining device it is necessary to re-shape the tubular material into a flat form again in order that it may pass to and through a pull-away device in a flat form to be rolled up. To this end we provide a pair of stretching means, such as 22, forming curved arms which are pivoted to the frame of the joining device and which can be swung toward and away from each other to regulate their pressure against the material. In order to regulate the pressure of these stretching arms on the ends I provide a slidable rack bar 23, shown in Fig. 4. This bar is suitably journaled on the frame of the machine and at its forward end is connected to a pair of arms 24, each of which is provided with a telescopic slidable joint, indicated by the numeral 25, which connects it with the respective arms 22. The rack bar can be adjusted in any desired position to regulate the tension of the arms 22 by means of a pivoted arm 26 having a pawl 27 to engage the teeth of the rack. This arm 26 is urged in one direction, as indicated in Fig. 4, by means of a spring 28. A handle 29 on the end of the rack bar 23 enables it to be moved back and forth to adjust the tension on the stretching arms. This provides a simple means whereby the material can be stretched in a regulated manner to flatten it out after it has been joined, but the provision of telescopic joints in each of the arms 24 will enable each of these arms to automatically adjust themselves as the character of the material in the tube may vary as to its tension and diameter. This independence of adjustment will enable the tube to run more smoothly and evenly through the machine at high speed.

In order to pull the material through the machine we provide a pull-away device comprising a series of rollers which are power-driven and preferably connected to operate in synchronism with the drive of the joining device. These pull-away rollers, indicated by the numeral 30, are mounted on suitable shafting and at least two of them, as shown in Fig. 2, are superposed and receive the material between them. These rollers on the upper side of the material, as shown in Fig. 1, are preferably knurled and have a considerably greater diameter near the center of the tube than along the rest of their length, so that the main contact on the material of this upper roller is along the center of the tube adjacent each side of the seam. In effect this construction and central pull of the pull-away device tends to pull the material through the machine more smoothly and evenly and keeps the seam running in a regular center line of the device requiring little, if any, effort on the part of the operator to guide the seam. This central pulling effect, in conjunction with the closely adjacent stretching arms, flattens the tube out and enables the material to be rolled up very smoothly.

It will be observed from Fig. 2 that the level of the joining device, where the material is joined, is higher than the level of the material as it passes through the pull-away rollers, and that the level of the pull-away rollers is about intermediate the level of the joining device and the bottom of the first forming frame 13, shown in Fig. 8. It has been found by trial that having the pull on the material exerted along an intermediate level creates a more efficient tension in the tube and in the material as it passes through the machine, and consequently results in a more even movement.

In Fig. 3 is shown a weight 31 which is hung from an arm 32 to bear on the block 33 in which the end of the upper shaft 30 is journaled so as to regulate the pressure of this shaft with respect to its operative mate and the material passing therebetween.

It will be seen therefore that this relatively simple apparatus forms a combination of operative elements which enable the material to flow smoothly and evenly at a fair rate of speed through the device to be transformed from sheet material to joined tubular material and then flattened out and rolled up or stored away in a continuous operation under the control of one operator of whom is required very little effort or skill.

We claim:

In a machine of the class described, means for joining sheet material into tubular form with a flat seam and the seam when formed being disposed along the top of the tube, means for pulling said tubular material away from said joining means, a spring pressed plate within the tube adjacent the joining means to press upwardly on the seam immediately after it has left the joining means; and means within the tube to exert horizontal pressure thereon to flatten it out just before it is engaged by the pull away means.

PERCY GARDNER.
RALPH KAGAN.